Figure 1:
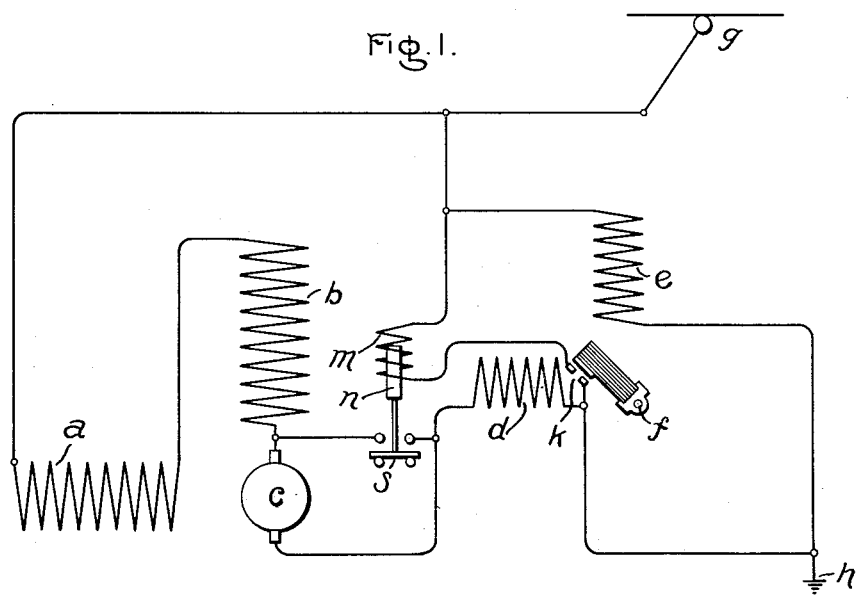

M. C. A. LATOUR.
ELECTRIC MOTOR CONTROL.
APPLICATION FILED OCT. 3, 1913.

1,157,313.

Patented Oct. 19, 1915.

Witnesses:

Inventor:
Marius C. A. Latour,
by
His Attorney.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

ELECTRIC-MOTOR CONTROL.

1,157,313.   Specification of Letters Patent.   Patented Oct. 19, 1915.

Original application filed February 23, 1909, Serial No. 479,550. Divided and this application filed October 3, 1913. Serial No. 793,085.

*To all whom it may concern:*

Be it known that I, MARIUS C. A. LATOUR, a citizen of France, residing at Paris, France, have invented certain new and useful Improvements in Electric-Motor Control, of which the following is a specification.

This application is a division of my application for Letters Patent of the United States, filed Feb. 23, 1909, Serial No. 479,550.

This invention relates to means for automatically effecting a change in the connections of an electric motor at a definite or predetermined speed of the motor and has for its object to provide a novel means for so controlling an electric motor.

More particularly, the object of this invention is to provide a novel means for effecting a desired change in the connections of an electric motor at a definite or predetermined speed of the motor.

Still more specifically, this invention has for its object the provision of novel means for controlling interrupters or switches arranged to permit the transition of an alternating current motor from operation as a repulsion motor to operation as a series repulsion motor or to operation as a series motor.

My invention is based upon the following principle. If the potential applied to the terminals of a continuous current motor is designated by V, the resistance of the armature by R, and the current absorbed in the motor by I, it is possible to derive the equation $$N = \frac{V - IR}{K\varphi},$$

in which N designates the number of rotations per second of the motor, K a constant, and $\varphi$ the flux in the inducing members of the motor. In reality, $\varphi$ is a function either of V, in the case of shunt motors, or of I, in the case of series motors. It may be said that N is a function of the two variables V and I, and it is, therefore, possible to conceive of devices which give the speed as a function of V and of I. In the case of a series motor, the flux is a certain function of the current F(I), and in this case the equation becomes $$N = \frac{V - IR}{KF(I)}.$$

If both the saturation and the resistance of the armature are neglected, the speed is evidently proportional to the apparent resistance of the motor, and in carrying out my invention the apparent resistance of the motor is measured by any suitable device and thereby an indication of the speed of the motor is secured. Various forms of devices employing the above principles for producing an action, or giving an indication, proportional to the speed of the motor may be used.

My present invention, accordingly, consists in providing a novel means for producing an action proportional to the speed of the motor and for employing this action for controlling the motor connections.

My invention will best be understood in connection with the accompanying drawings, in which—

Figure 2:
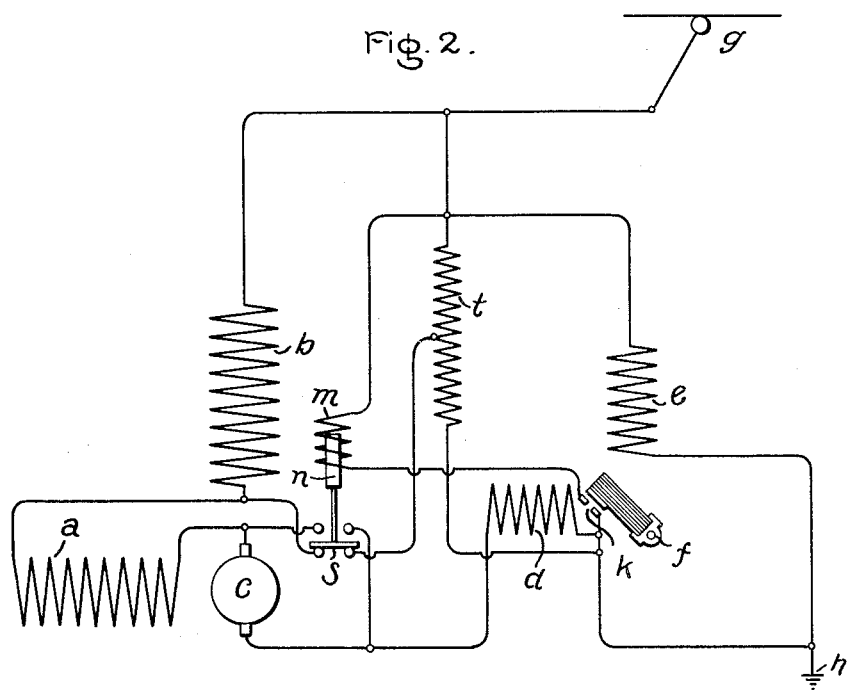

Figure 1 shows in a diagrammatic manner one of the various forms of apparatus in which my invention may be embodied. For the purposes of illustration I have shown my invention, in the accompanying drawings, in connection with an alternating current motor of the commutator type and provided with brushes. In Fig. 1 my invention is employed to effect a change from a repulsion motor connection to a series motor connection. In Fig. 2 my invention is employed to change the motor connections from a repulsion motor connection to a series repulsion motor connection. In accordance with my invention the change in the motor connections is automatically effected when the speed of the motor attains a predetermined value.

In the arrangement shown in Fig. 1, which is only a diagram and does not attempt to show any details of construction, a series traction motor having an exciting winding *a*, and compensating winding *b*, and an armature winding *c*, is connected in series between the trolley indicated by *g*, and the ground marked *h*. In the specific form of apparatus shown in the drawings, a coil $e$ is energized by the potential at the terminals of the motor and gives a flux perpendicular to the flux produced by a coil $d$, which is connected in series with the motor, and, therefore, is traversed by the current through the motor. A suitably mounted armature or bar of soft iron $f$ takes the direction of the resultant field produced by the two coils $d$ and $e$, and this position is, therefore, an indication or measure of the speed of the motor.

It will be obvious to those skilled in the art that the same controlling apparatus will satisfactorily operate with either continuous current motors or with alternating current series or repulsion motors if in some suitable way the apparatus employed with alternating current motors is prevented from becoming the seat of a rotary field adapted to give the armature $f$ a rotary movement.

The movement of the armature $f$ may be utilized in any suitable way to perform any automatic operation which must be effected at a definite or predetermined speed. For example, the armature $f$ may, either directly or through relays, control interrupters or switches arranged to permit the transition of the motor from operation as a repulsion to operation as a series repulsion motor. The device may also be employed to act automatically as soon as a certain rate of super-synchronism is attained and cause the motor to change from operation as a repulsion to operation as a series motor.

In Fig. 1 of the drawings I have shown my invention applied to effect a change in the motor connections from a repulsion motor connection to a series motor connection. As illustrated in this figure of the drawings the armature $f$ operates to connect the contacts $k$, when the speed of the motor is below a certain definite and predetermined speed. When the contacts $k$ are connected the commutator brushes of the motor are short-circuited and the motor operates as a repulsion motor. When the speed of the motor increases beyond the predetermined speed the armature $f$ moves away from the contacts $k$ and the short-circuit around the commutator brushes is interrupted and the motor operates as a series motor or compensated series motor. In the drawings, I have shown the contacts $k$ controlling the circuit of a relay winding $m$. The relay is of the solenoid type and has an armature $n$ which is operatively related to the contact switch $s$ for controlling the circuit around the commutator brushes. It will, of course, be understood that numerous other means actuated by the armature $f$ may be employed for effecting the desired connection across the commutator brushes of the motor.

In Fig. 2 of the drawings I have shown my invention arranged to change the connections of an alternating current motor from a repulsion motor connection to a series repulsion motor connection. This particular change of connections was devised by Mr. E. F. Alexanderson, and is described in the transactions of the American Institute of Electrical Engineers, vol. 27, Part 1, 1908, pages 1 to 17. At starting and at predetermined low speeds of the motor the contacts $k$ are closed and the solenoid operated switch $s$ is raised so that the commutator brushes of the motor are short-circuited. When the motor attains a predetermined speed the contacts $k$ are open-circuited, and the switch $s$ falls upon the lower set of its coöperating contacts, whereby a voltage derived from a transformer winding $t$ is impressed upon the motor windings to effect the series repulsion motor connection.

While I have illustrated in the drawings of this application specific applications and specific arrangements of apparatus for carrying out my invention, it will be understood that I do not desire to be limited to the particular applications or details of arrangements illustrated and described. My invention is, obviously, adapted to be employed in the control of electric motors, and in particular alternating current motors, in various other ways than that described herein.

In accordance with the provisions of the patent statutes, I have described the principle of operation of my invention, together with the apparatus which I now consider to be the best embodiment thereof, but I do not limit myself to this particular embodiment and seek in the appended claims to cover all embodiments which shall be within the scope of my invention and obvious to those skilled in the art.

What I claim as new and desire to secure by Letters Patent of the United States, is:—

1. The combination with an alternating current motor of the commutator type provided with brushes, of controlling means for short circuiting the commutator brushes, and a device having one winding connected in shunt relation to the terminals of the motor and a second winding connected in series relation with the motor for actuating said controlling means.

2. The combination with an alternating current motor of the commutator type provided with brushes, of controlling means for short-circuiting the commutator brushes, a device having one winding connected in shunt relation to the terminals of the motor and a second winding connected in series relation with the motor, and a movable member inductively related to said windings and adapted to actuate said controlling means.

3. The combination with an alternating current motor of the commutator type provided with brushes and adapted to be connected as a repulsion motor and as a series repulsion motor, controlling means for changing the connections of the motor from the repulsion motor connection to the series repulsion motor connection, and a device responsive to the apparent resistance of the motor for actuating said controlling means.

4. The combination with an alternating current motor of the commutator type provided with brushes and adapted to be connected as a repulsion motor and as a series repulsion motor, controlling means for changing the connections of the motor from the repulsion motor connection to the series repulsion motor connection, a device having one winding connected in shunt relation to the terminals of the motor and a second winding connected in series relation with the motor, and a movable member inductively related to said windings and adapted to actuate said controlling means.

In witness whereof, I have hereunto set my hand this 20th day of September 1913.

MARIUS C. A. LATOUR.

Witnesses:
  HANSON C. COXE,
  LUCIEN MEMMINGER.